United States Patent [19]

Frank et al.

[15] 3,703,680
[45] Nov. 21, 1972

[54] CAPACITOR BANK FOR AC NETWORKS

[72] Inventors: Kjell Frank; Lennart Johansson, both of Vasteras, Sweden

[73] Assignee: Allmanna Svenska Elektriska Aktiebolaget, Vasteras, Sweden

[22] Filed: Feb. 8, 1971

[21] Appl. No.: 113,316

[30] Foreign Application Priority Data

Feb. 9, 1970 Sweden .................. 1580/70

[52] U.S. Cl. .................................. 323/101, 323/128
[51] Int. Cl. ................................................ G05f 1/68
[58] Field of Search ..... 307/99, 103, 135; 323/22 SC, 323/93, 101, 105, 24, 106, 128

[56] References Cited

UNITED STATES PATENTS 3,530,370  9/1970  Yamachi et al. ........ 323/128 X
3,400,326  9/1968  Zhukov et al. ......... 323/128 X Primary Examiner—A. D. Pellinen
Attorney—Jennings Bailey, Jr.

[57] ABSTRACT

A capacitor bank for alternating current networks has a number of parallel branches each of which is connected by antiparallel-connected thyristors to the network. There is a control device for each thyristor which, when the bank is fully loaded, connects the thyristors in one conducting direction or the other in synchronism with the maximum of the network voltage in such direction. Each branch of the bank can be recharged by the full load during each half-period of the network voltage. Upon the occurrence of reduced load on the bank, the control devices emit current pulses to connect the thyristor switches in one direction or the other of the maxima of the network voltage in such direction for recharging. These latter pulses are emitted at a frequency which is substantially less thaN the network frequency.

8 Claims, 5 Drawing Figures

CONTROL DEVICES   RING COUNTER   REACTIVE POWER SENSITIVE MEANS

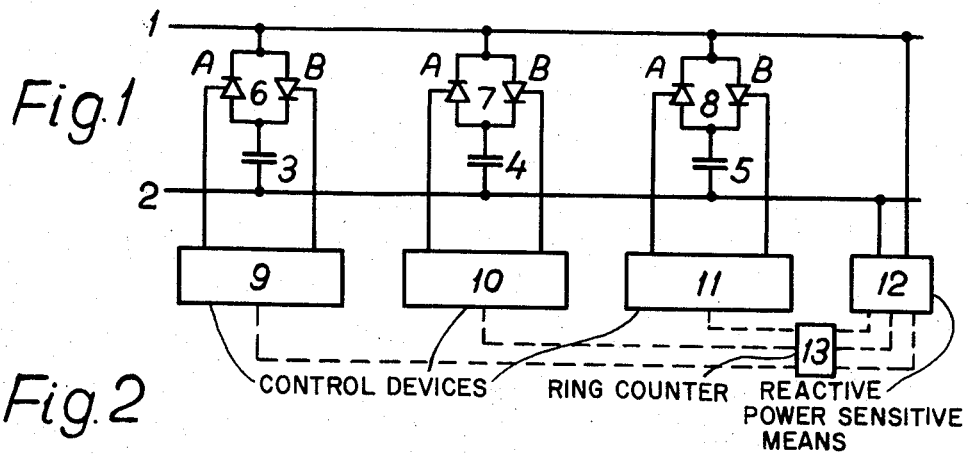
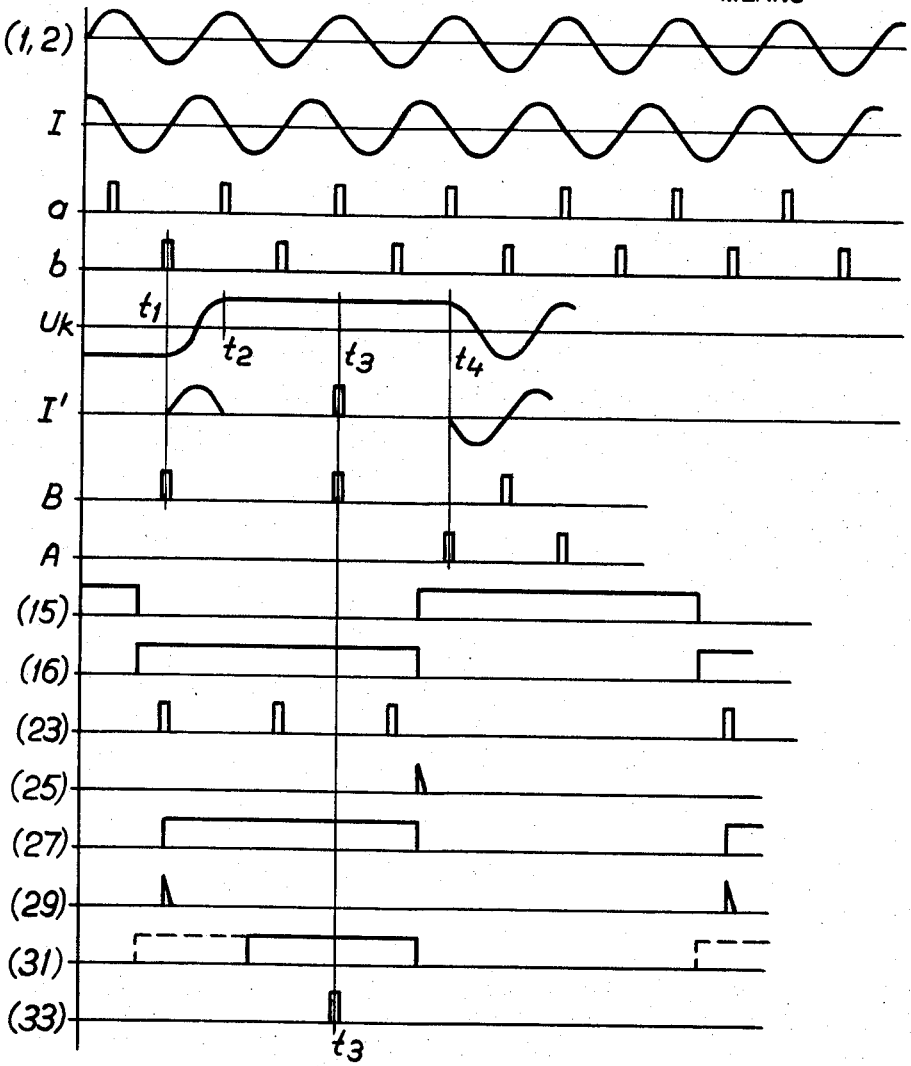

CAPACITOR BANK FOR AC NETWORKS

BACKGROUND OF THE INVENTION

1. Field of the Invention

The present invention relates to a capacitor bank for an AC network, in which the various parts of the bank are connected to the network with the help of thyristor switches, the connection consisting of antiparallel-connected thyristors with the help of which the various branches of the bank can be connected and disconnected.

2. The Prior Art

Such a connection in a capacitor band, using a thyristor switch, is mostly of importance in networks where considerable oscillations occur in the reactive power, which may be the case in industrial areas where heavy machinery and equipment with unfavorable load conditions from the network point of view are supplied with power from the network. By using a thyristor switch for connection and disconnection of a capacitor bank, such high control speeds can be achieved that capacitor banks as phase compensators can, at least in some cases, replace considerably more expensive synchronous condensors.

A bank part can most easily be connected by supplying a constant control voltage to the control electrodes of the antiparallel thyristors so that the thyristors simply function as diodes. However, problems may then arise with switching over-voltages during connection and disconnection of the bank.

If such over-voltages are to be avoided, the connection and disconnection of the bank, as well as switching between the thyristors during operation, must take place when there is no current, that is to say at or just before the positive and negative amplitude values of the network voltage. In this way, the various thyristors will be conducting for half a period at a time, thus recharging the corresponding capacitor branches.

This in turn means that, when the bank or parts thereof are disconnected, these parts have full voltage and should also be held in reserve at full voltage so that when they are reconnected they can be connected to the maximum voltage of the network without any connection shocks occurring.

The above is in itself quite conventional but raises problems in the choice of capacitors. Keeping the bank in reserve with full voltage involves a DC stress which requires that the bank built up of DC capacitors, since dielectric in AC capacitors should not be subjected to direct voltage for any length of time. However, such DC capacitors are considerably more expensive than normal AC capacitors and it would therefore by very advantageous if the DC load on the capacitors could be avoided.

SUMMARY OF THE INVENTION

According to the invention, therefore, it is proposed to control the thyristors so that the capacitors are continuously recharged even during the reserve periods, that is, when the capacitors are in principle unloaded. In this way purely DC stresses on the capacitors are avoided and the considerably cheaper AC capacitors can be used, the dielectric of which cannot stand long periods of DC stress. The capacitor bank has a number of parallel branches each of which is connected by antiparallel-connected thyristors to the network. There is a control device for each thyristor which, when the bank is fully loaded, connects the thyristors in one conducting direction or the other in synchronism with the maximum of the network voltage in such direction. Each branch of the bank can be recharged by the full load during each half-period of the network voltage. Upon the occurrence of reduced load on the bank, the control devices emit current pulses to connect the thyristor switches in one direction or the other of the maximum of the network voltage in such direction for recharging. These latter pulses are emitted at a frequency which is substantially less than the network frequency.

The frequency of the recharging during reserve periods can be chosen within rather wide limits. However, the upper limit should not exceed 1–10 Hz if the bank is to be considered as disconnected, as a switching frequency in this region produces a disturbance frequency which may be irritating, for example in lighting equipment. The lower limit is determined by the time during which the capacitors can with reasonable safety be subjected to DC load without there being any risk of gas-formation in the dielectric.

BRIEF DESCRIPTION OF THE DRAWINGS

The invention will be further described with reference to the accompanying drawings in which FIG. 1 shows a capacitor bank according to the invention, whereas FIG. 2 shows voltage and current curves for this under load as well as during periods of reserve;

DESCRIPTION OF THE PREFERRED EMBODIMENTS

Figure 3:
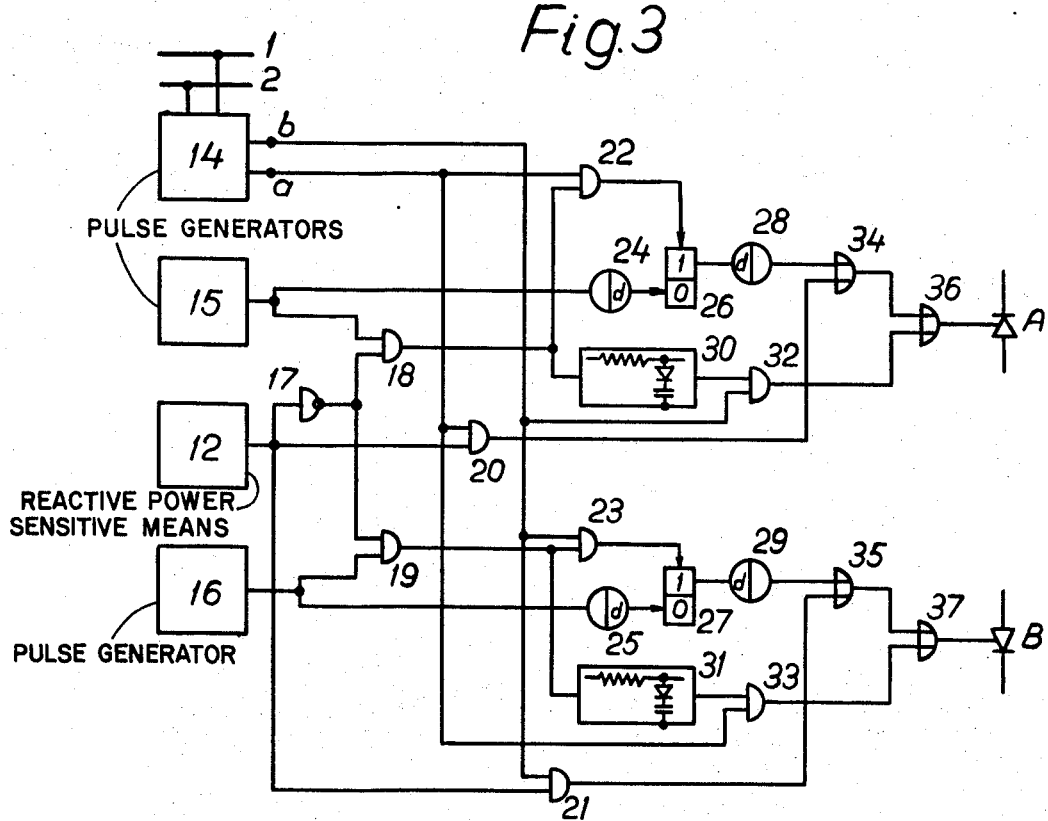
FIGS. 3 and 4 show examples of control devices for the thyristor switch according to the invention and FIG. 5 shows voltage curves for the various steps in the device according to FIG. 4.

FIG. 1 shows a single phase alternating current network consisting of two conductors 1 and 2 between which is connected a capacitor bank comprising three parallel branches 3, 4, 5, with the help of thyristor switches 6, 7, 8, comprising two antiparallel connected thyristor branches A and B. Only one capacitor is shown for each branch in the drawing, but in reality there is a considerable number of series and parallel connected capacitors corresponding to the rated voltage, rated current and rated capacitance of the capacitor part in question. Furthermore, in each thyristor switch only two antiparallel connected thyristors are shown whereas in fact the thyristor switch consists of two antiparallel branches, each containing series and parallel connected thyristors corresponding to the rated voltage and rated current of the capacitor part in question.

The thyristor switches are provided with individual control devices 9, 10, 11, with the help of which these switching members are controlled between the positions for normal operation and reserve. These control devices are described in more detail in FIG. 3. They are in turn controlled by a means 12 in accordance with the reactive power in the network 1, 2 so that, upon increasing inductive load in the network, several capacitor branches will be connected but, upon decreasing inductive load in the network, one or more of the capacitor branches will be transferred to the reserve position. The device 12 may be designed in accordance with Swedish patent No. 314,430, U.S. Pat. No. 3,424,971 or Canadian Pat. No. 815,666.

In order to explain the principles of the construction of the control devices 9 –11 according to the invention, attention is drawn to FIG. 2 where the voltage and current curves for network and capacitors and control pulses for the thyristors are indicated.

FIG. 2 indicates the curve (1,2) of the network voltage between the conductors 1 and 2. During normal operation, that is, normal loading of a capacitor branch, the capacitor voltage will have the same appearance whereas the capacitor current I will be 90° before, as indicated in the second curve in FIG. 2. Every time the current passes through zero, which means maximum voltage on the capacitor, the current should be switched between the thyristors A and B in a thyristor switch. The reason for this is that a changeover at any other moment would cause voltage and current jumps which would give rise to connection over-voltages. The control pulses a and b for the thyristors A and B, respectively, must therefore be emitted according to FIG. 2, third and fourth rows.

FIG. 2, fifth row, shows the capacitor voltage Uk as, according to the invention, it should look during a reserve period. Disconnection of the bank is done by simply disconnecting the normal control pulses of the thyristors so that the most recently conducting thyristor is blocked the next time the current passes through zero, the capacitor voltage at the same time having a maximum of one polarity or the other. In FIG. 2 the capacitor voltage Uk has negative polarity until the moment $t1$ when the thyristor B receives an ignition pulse, see FIG. 2B. The capacitor will then be recharged during the next half period $t1 - t2$ with a charging current I according to FIG. 2 so that the capacitor voltage Uk becomes positive.

Because of built-in leakage resistance, among other things, the capacitor voltage will gradually decrease which is unsuitable since a lower capacitor voltage causes voltage shocks both during recharging during the period of reserve and during reconnection of the capacitor. The thyristors in question should therefore be connected at intervals in order to maintain the charge as shown at the moment t3. This moment corresponds to the positive maximum value of the network voltage and, if the maintenance pulses occur sufficiently often — preferably each period — the discharging of the capacitor will be slight and the voltage shocks upon maintenance charging will negligible. It can be seen from FIG. 2B that the recharging pulses will be synchronous with the normal control pulses according to FIG. 2b. The maintenance pulses, however, will be in counter-phase to the normal control pulses.

At the moment $t4$, it is assumed that the need for network capacitance has increased so that the capacitor branch in question must be connected again. This is done by connecting the normal control pulses of the thyristor in accordance with FIGS. 2a and b. At the next voltage maximum, therefore, the next thyristor in turn will be ignited.

FIG. 2 now shows the program necessary in order to control the thyristors of a capacitor branch during normal operation and periods of reserve alternately. In the first case synchronous pulses of network frequency are required in accordance with FIGS. 2a and b. In the second case synchronous pulses are required for the recharging, but with considerably lower frequency, that is, within the limits mentioned above. Finally, it may be necessary to provide maintenance pulses in counter phase to the normal control pulses. If the recharging frequency is kept in the vicinity of the upper frequency limit where recharging takes place every half second, for example, these maintenance pulses may possibly be omitted. If, however, there is a tendency towards a lower limit where the recharging intervals approach one minute, for example, the maintenance pulses will be necessary if switching over-voltages are to be avoided. Furthermore, these maintenance pulses can be connected at every voltage maximum in the direction in question or only at some of these voltage maxima.

A control device according to the invention is suitably designed with different generators which can emit the above- mentioned pulse series and a system for connecting and disconnecting these pulse series in accordance with the signal from 12. An example of one of the control devices 9 – 11 is shown in FIG. 3.

The device 12 emits a signal when the respective capacitor group is to be switched in by the thyristors A and B and if the signal from 12 ceases the thyristor switch transfers to its reserve position. The thyristors A and B are controlled from 12 over two separate pairs of AND-gates 18, 19 and 20, 21, the former pair being controlled from 12 over a signal converter 17. This means, therefore, that if 12 emits a signal the AND-gate 20 and 21 will be activated whereas 18 and 19 are blocked because the signal from 17 is zero. If, on the other hand, the signal from 12 disappears, 20 and 21 will be blocked and the signal converter 17 will emit a signal to 18 and 19.

The network voltage over the conductors 1, 2, which is indicated in the first curve in FIG. 2, is connected to the pulse generator 14 which derives from the network voltage the two pulse series on the outputs a and b. These two pulse series correspond to the positive and negative amplitudes of the network voltage and are shown as the third and fourth curves in FIG. 2. It is these two pulse series which are to control the thyristors A and B when the capacitor group is connected, and this is done over the AND-gates 20, 21 the OR-gates 34, 35 and 36, 37. The pulses over the outputs a and b should fall within the maximum points of the network voltage, or just before, so that the thyristors become conducting when the voltage passes the maximum point and the recharging of the capacitor is to start.

If the signal from 12 disappears the AND-gates 20, 21 are blocked so that the normal control pulses of the thyristor disappear. The thyristor conducting at that moment is blocked when the current next passes through zero, which means that the capacitor group is left charged to maximum voltage in one direction. During the period of reserve which follows, the capacitors must be recharged with a certain low frequency, which is controlled from the pulse generators 15 and 16, the output pulses of which are shown in FIG. 2 (15) and (16). The period for pulses should normally be at least 5 to 10 times longer than for the network voltage, but for the sake of clarity it has been chosen considerably shorter in FIG. 2. The phase position and period for these pulses may otherwise be chosen irrespective of the phase position and period of the network voltage.

If we start with the curve Uk in FIG. 2, where at the start the capacitor has negative voltage on its upper half, the thyristor B is to be made conducting at the next recharging. These gates 18 and 19 already have an input signal from 17 since the signal from 12 is zero.

When the output from 16 becomes positive, therefore, the gate 19 will emit a signal to the AND-gate 23, which means that the pulses b from 14 go through 23 according to the curve (23) in FIG. 2 and connect the bi-stable circuit 27, which thus gives an output signal. The output signal from 27 continues until the signal pulse from 16 ceases, whereupon the derivative member 25 emits a pulse, (25) in FIG. 2, which returns the bi-stable circuit to one position. The output signal from 27, therefore, acquires an appearance shown by the curve (27) in FIG. 2. The signal from 27 causes the derivative member 29 to emit a pulse - (29) in FIG. 2 - at the beginning of the signal, which pulse ignites the thyristor B at the moment t1. It is seen that the ignition of thyristor B for recharging is carried out by the normal control pulses from the output b on the generator 14.

In order to maintain the capacitor voltage during the reserve period, the signal from 19 is connected to a second AND-gate 33 over a delay member 31. This delays the signal 16 for a period of the network voltage 1, 2 in order to prevent the maintenance pulses from being connected as early as the moment t1 in FIG. 2, which is unnecessary since it is at that point that B should cease to be conducting. On the other hand, the member 31, at least in principle, is not absolutely necessary and can therefore be omitted. The signal from 31 is shown by the curve (31) in FIG. 2 and causes the AND-gate 33 to transmit the pulses from the output a on the generator 14, which pulses influence the thyristor B through the OR-gate 37. In FIG. 2 where the period for recharging is only 2.5 times the period of the network, only one maintenance pulse (33) will occur at the moment t3 during each half-period of recharging.

Each of thyristor switches 6 - 8 is provided with a control device 9 - 11 in accordance with FIG. 3. These control devices, as mentioned, are controlled in turn by the member 12 which connects the capacitor groups to and disconnects them from the network depending on the need for compensating capacitance in the network. A permutating member 13 may be inserted, for example in the form of some sort of ring counter, so that, upon partial loading of the capacitor bank, the load is distributed evenly over all groups.

For the same reason the low frequency generators 15 and 16 for the various control devices 9 14 11 should suitably be phase-displaced in relation to each other so that the various capacitor groups lying in reserve are not recharged during the same period of the network voltage.

This latter principle can be developed by using generators 15 and 16 with variable frequency and pulse length. By sufficiently fine division of the bank in parallel branches, continuous control of the capacitance is possible from full value to the value of one branch, the load in the latter case being continuously moved from branch to branch of the bank. The recharging current pulses according to FIG. 2B thus disappear completely and an entirely uniform load distribution is obtained all the time over the capacitor branches.

Figure 4:
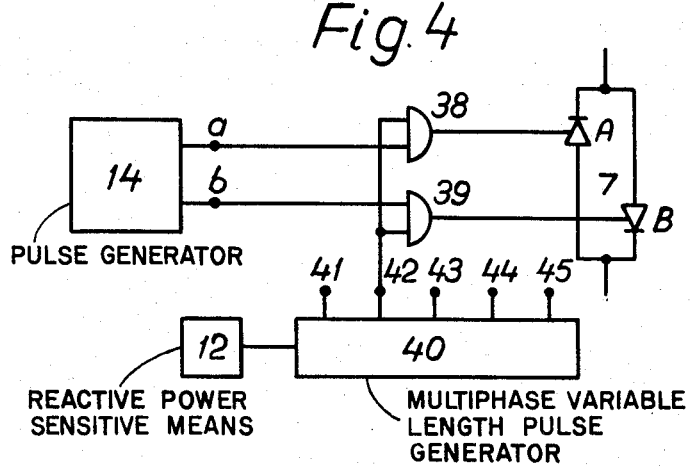

In this case the control device can be simplified to some extent in relation to FIG. 3, as is clear from FIG. 4 which shows how the terminals a and b of the control pulse generator 14 of FIG. 3 are connected to the two thyristors A and B in a thyristor switch over two AND-gates 38, 39. To another input on these AND-gates are connected pulses from one phase of a multiphase pulse generator 40 with variable pulse length and the output phases 41-45 corresponding to five thyristor switches for a capacitor bank having five branches. The pulse length is regulated by the regulator 12 of FIG. 1.

Figure 5:
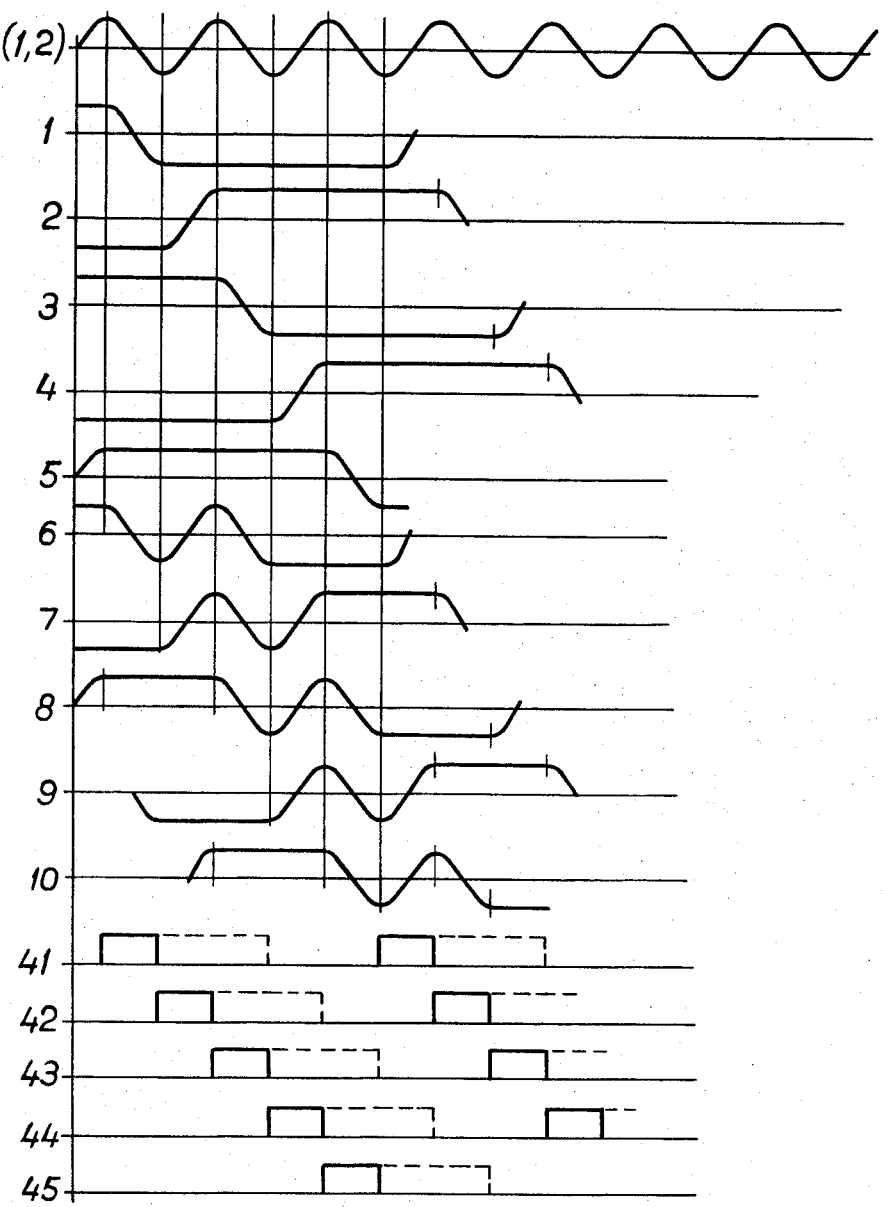

The variation of the pulses from the generator 40 and the corresponding capacitor voltages is clear from FIG. 5 which shows in the first row the network voltage (1,2). The next five rows 1 - 5, shows the capacitor voltages for five capacitor branches at the lowest capacitance, that is only one capacitor branch is recharged during each half-period. This is achieved if the pulse length of the generator 40 is half the period of the network. These pulses are illustrated in row 41 - 45 in FIG. 5 with unbroken lines. With only five capacitor branches the pulse trains from the generator 40 will succeed each other according to the rows 41 - 45 in FIG. 5. In practice, however, the number of capacitor branches is very much greater in order to have a sufficient number of steps in the control.

Rows 6 - 10 in FIG. 5 show the capacitor voltages at the next stage of the control process where the thyristor switches are active for three half-periods at a time. This is done by extending the pulses from the pulse generator 40 by the dotted parts. In this way three capacitor branches will always be recharged at the same time so that the capacitance will be three times as great as in the rows 1 - 5. The thyristor switches according to FIG. 5 must always be active an odd number of half network periods at a time so that a connection period also causes recharging of the capacitor branch in question and no DC component can arise over the capacitor branch.

Furthermore, it is seen that the capacitor branch is made active must have the same charging polarity as that which it succeeds and the number of capacitor branches must therefore be odd. The number of capacitor branches may therefore be expressed as $2 \cdot n + 1$, where $n$ is an integer. The phase number of the control pulse generator 40 must then also be $2 \cdot n + 1$. Furthermore, the period for the control pulse generator must be $(2 \cdot n + 1)$ times half the period of the network and the pulse length of the output pulses of the generator must be $(2 \cdot a + 1)$ times half the period of the network, where $a$ is an integer which may vary between 0 and $n$. The number of steps in the bank will be $n$ and each step is represented by the capacitance of two capacitor branches. It is here assumed that individually the capacitor branches has so little capacitance that the rows 1 - 5 in FIG. 5 where only one capacitor branch is active at a time corresponds to disconnection of the capacitor bank, that is negligible capacitance in relation to the full capacitance. If this is not the case, it would be possible to reduce the frequency of the control pulse generator 40 so that the period of this will be $k \cdot (2 \cdot n + 1)$ times the period of the network where K is an integer. In this way the bank will be recharged upon disconnection in the same way as in accordance with FIGS. 3 and 4, namely with a frequency lower than 1 Hz for the entire bank.

We claim:

1. Capacitor bank for alternating current networks comprising a number of parallel branches (3, 4, 5), a thyristor switch (6, 7, 8) connecting each branch to the network (1, 2), each said thyristor switch (6, 7, 8) having thyristors (A, B) in both current directions, a control device (9, 10, 11) for each thyristor switch including means operative when the bank is fully loaded to connect the thyristors in one conducting direction or the other in synchronism with the maxima of the network voltage in such direction, for recharging each branch of the bank at full load during each half-period of the network voltage, at least some of said control devices including means responsive to a reduced load on the bank to emit control pulses to connect the thyristor switches in one direction or the other at the maxima of the network voltage in such direction for recharging the bank branch in question, said last means emitting pulses with a frequency which is substantially less than the network frequency.

2. Capacitor bank according to claim 1, including means operable during periods having lower connection frequency to furnish extra control pulses to the thyristors upon maximum voltage in the network having the same polarity as the respective capacitor voltage, said extra control pulses being phase-displaced 180° in relation to the original control pulses for the same branch, whereby to maintain the capacitor voltage.

3. Capacitor bank according to claim 1, in which a regulator means connects the network to the control devices (9, 10, 11) for the thyristor switches (6, 7, 8) to control the control devices in accordance with the reactive power of the network.

4. Capacitor bank according to claim 3, in which a permutating device (13, 40) is connected between said regulator (12) and control devices (9, 10, 11) for the thyristor switches, said permutating device including means operable when the capacitor bank is only partially loaded to switch the various branches in and out in a cyclic sequence.

5. Capacitor bank according to claim 4, in which the number of thyristor switches (9, 10, 11) switched in during each half-period of the network voltage varies with the load.

6. Capacitor bank according to claim 5, in which said permutating device comprises a multiphase pulse generator (40), the phase number of which is equal to the number of parallel capacitor branches and having variable pulse length, each of said control devices (9 – 11) being connected to and activated from a separate output terminal (41 – 43) of said multiphase pulse generator, said regulator (12) including means to control the variable length of the pulses from said generator (40).

7. Capacitor bank according to claim 6, in which the number of parallel capacitor branches in $2 \cdot n + 1$, where n is an integer, the period of the pulse generator being $(2 \cdot n + 1)$ times half the period of the network (1, 2), whereas the pulse length is $(2 \cdot a + 1)$ times half the period of the network, where $a$ is an integer which may be varied between O and $no$ 8. Capacitor bank according to claim 1, including means to switch in the thyristors of several reserve capacitor branches to recharge the branches during varying periods of the network voltage.

* * * * *